J. ALLINGHAM.
PROCESS OF AND APPARATUS FOR RECOVERING METALS FROM ORES.
APPLICATION FILED SEPT. 26, 1919.

1,403,463.

Patented Jan. 10, 1922.

INVENTOR,
John Allingham;
BY
ATTORNEY.

UNITED STATES PATENT OFFICE.

JOHN ALLINGHAM, OF LOS ANGELES, CALIFORNIA.

PROCESS OF AND APPARATUS FOR RECOVERING METALS FROM ORES.

1,403,463. Specification of Letters Patent. Patented Jan. 10, 1922.

Application filed September 26, 1919. Serial No. 326,544.

*To all whom it may concern:*

Be it known that I, JOHN ALLINGHAM, a subject of the King of Great Britain, residing at Los Angeles, in the county of Los Angeles and State of California, have invented new and useful Improvements in Processes of and Apparatus for Recovering Metals from Ores, of which the following is a specification.

The present invention relates to an improved process of and apparatus for recovering metals from their ores, and the invention is more especially adapted for the treatment of ores containing silver, gold, zinc, lead, copper oxides, and the object of the invention is to provide for the effective and economical extraction of the valuable metal from the ores.

With this and other objects in view, the invention consists in a novel process for the electrolytic treatment of ores and also in an electrolytic cell for carrying out the process, as will more fully appear as the description proceeds, the novel features of the invention being pointed out in the appended claims.

For a full understanding of the invention reference is to be had to the following description and accompanying drawing in which.

Corresponding and like parts are referred to in the following description and indicated in both of the views of the drawing by like reference characters.

Figure 1:
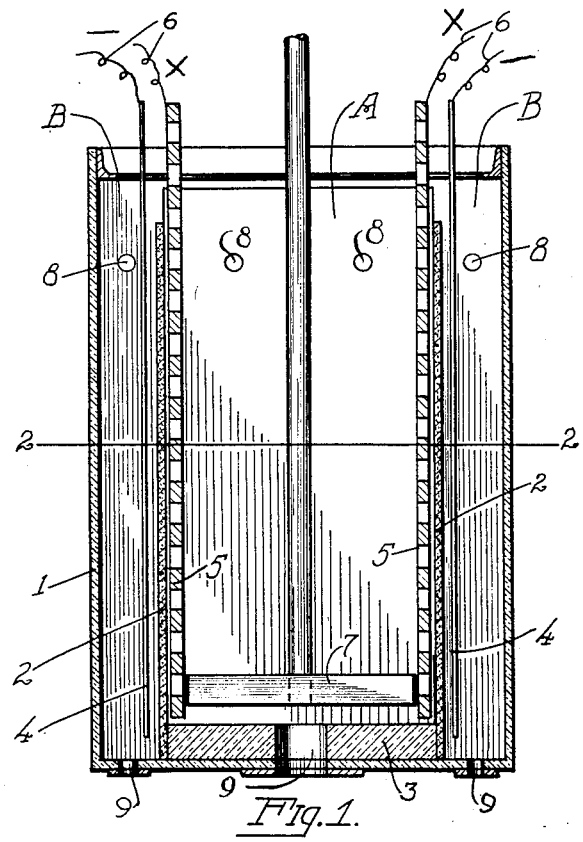
Figure 1 is a vertical sectional view through an electrolytic cell which is adapted for use in carrying out the present process for the extraction of metals from their ores.
Figure 2:
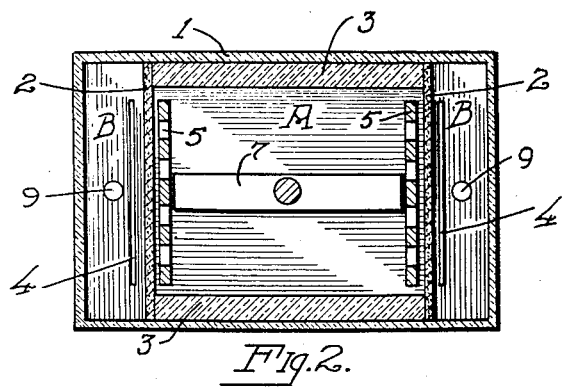
Figure 2 is a horizontal sectional view through the cell taken on the line 2—2 of Figure 1.

The drawing illustrates one form of electrolytic cell which is adapted for use in carrying out my improved process for extracting metals from their ores. The numeral 1 designates a tank which may be of any suitable size and shape, being shown in the present instance as having a rectangular configuration. This tank may be conveniently formed of any suitable material, preferably iron. A pair of transverse partitions 2 extend across the tank at points toward opposite ends thereof, said partitions being formed by diaphragms of corundum, or similar material, and being suitably cemented or otherwise secured to the walls of the tank. These partitions form an anode chamber A at the middle portion of the tank, and smaller cathode chambers B at the ends of the tank. The sides and bottom of the anode chamber A are shown provided with a suitable lining 3 of acid and chemical resisting material. The cathodes 4 which are placed in the two cathode chambers may be in the form of iron screens, while the anodes 5 which are placed opposite the anode chamber A facing the diaphragms are in the form of grids of fused magnetite. The two sets of anodes and cathodes are suitably connected to the terminals 6 of direct current electric circuits, and a suitable agitator 7 is provided within the anode chamber A. Both anode chamber A and cathode chamber B are provided at points toward the top thereof with openings 8, and at the bottom thereof with openings 9, for convenience in filling the battery with the electrolytic solution and withdrawing it therefrom, and, under some conditions, there may be a continuous flow of the solution through the battery in order to carry on the process as a continuous operation. It will be undersood that one set of openings will serve as inlets, the other as outlets.

In carrying out the process there is first prepared a suitable electrolyte with which the cathode compartments are filled. It has been found that a solution containing about 15 per cent of sodium chloride and about 5 per cent of sodium sulphate dissolved in water gives satisfactory results. Such a solution gives an excess of salt over and above that which is decomposed by the current action, so that all chloride formed by re-action with the liberated chlorine will be dissolved in the remaining excess of chlorides present. The ore to be treated such as gold, silver, zinc, lead, copper is crushed and ground to such a fineness as to pass through a suitable mesh, the exact degree of fineness depending upon the character of the ore. For most ores a mesh of one hundred to the inch is satisfactory. This finely crushed ore is thoroughly mixed with the electrolyte described in such a proportion as to make a fluid pulp. A ratio of one part of the finely crushed ore to two parts of the liquid solution has proven practical. If desired this initial mixing of the crushed ore with the solution may take place in a tank equipped with a suitable agitator. The fluid pulp formed is passed through the anode chamber A of a battery or cell similar to that which has just been described, where it is subjected to the action of a low voltage direct current, while agitated continuously. The passage of the electric current through the electrolyte acts in accordance with well-known phenomena and laws to decompose the sodium chloride and liberate chlorine at the anodes while caustic soda is formed at the cathodes. Similarly, the sodium sulphate is acted upon to form sulphuric acid at the anodes and caustic soda at the cathodes.

The diagrams effectively prevent the solid particles of the pulp from reaching the cathode chambers, and do not interfere with the above described reactions in which caustic soda is formed at the cathodes, and chlorine and sulphuric acid at the anodes.

The nascent chlorine and sulphuric acid immediately attack the metal content of the pulp and combine therewith to form chlorides and soluble sulphates. The silver chloride which is ordinarily insoluble becomes soluble in the excess of chlorides present, so that the pulp now contains in solution the greater part of the metal content of the ores. The contents of the anode chamber A of the cell are now carried into a digester or after-treater, which is a suitable tank equipped with some form of agitating device, where the pulp is kept in motion until most of the metal has been dissolved by the action of the chlorine and sulphuric acid previously generated. After these desired chemical reactions are complete the pulp is carried to a filter and the sands or tailings separated from the pregnant solution and discarded. This may be accomplished by means of any standard filtration apparatus.

The filtrate or pregnant solution thus obtained is now mixed with the caustic soda contents of the cathode compartments B of the cell, whereupon most of the metals in the solution are precipitated in the form of hydroxides which are separated or removed from the solution by some standard filtering device. The remaining solution still contains silver, and this is precipitated by treating the solution with zinc or aluminum dust. This operates in the well-known manner to produce the customary reactions whereby the silver is precipitated as a metal. This metallic silver is filtered off and melted into bars. The residual solution is now ready to be used over again and, in actual practice, it has been found that this can be done with the addition of a little sodium chloride and sodium sulphate to replace that which may have been lost mechanically or otherwise in the process. The entire process can be carried on in a continuous cycle by providing a plurality of cells sufficient to treat the desired quantity of ores. The pulp and electrolyte can be circulated through the different cells until the chemical reactions are completed, and by suitably arranging the apparatus the process can be carried on continuously without any delays or loss of time, the solution being used over and over again with the addition of small amounts of salts to replace losses.

It will be understood that it is not the intention of this invention to precipitate the metals upon the cathodes as is done in other electrolytic processes, but as far as possible to avoid this, and to disassociate the sodium chloride and sodium sulphate in the electrolyte so as to form soluble chlorides and sulphates with the metals in the pulp which can be subsequently treated. While I have described one particular form of cell which is adapted for use in carrying out the process, and one particular sequence of steps which can be used to advantage when treating an ore containing silver oxides, it will be understood that I do not restrict myself to the exact details of construction or to the exact sequence of steps in carrying out the process, since many modifications and variations are possible without departing from the spirit of the invention.

What I claim and desire to secure by Letters Patent is:

1. The process of extracting gold, silver, zinc, lead, copper from their ores, which consists in crushing the ore and mixing it with a solution of sodium chloride and sodium sulphate, subjecting the mixture to electrolytic action and permitting the chlorine and sulphuric acid formed thereby to attack the metal contents of the ore to form chlorides and sulphates which are dissolved in the solution, and subsequently treating the solution to recover the metals.

2. The process of extracting the metals gold, silver, zinc, lead, copper from their ores, which consists in crushing the ore and mixing it with a solution of sodium chloride and sodium sulphate, subjecting the mixture to electrolytic action and permitting the chlorine and sulphuric acid formed thereby to attack the metal contents of the pulp and form chlorides and sulphates which are dissolved in the solution, filtering the barren solids from the resultant pregnant solution, and subsequently treating the filtrate to precipitate the metals.

3. The process of extrating the metals gold, silver, zinc, lead, copper from their ores which consists in crushing the ore and mixing it with a solution of sodium chloride and sodium sulphate, subjecting the mixture to electrolytic action in the anode chamber of a cell in which the anode and cathode chambers are separated, whereby the caustic soda formed in the cathode chamber is separate from the chlorine and sulphuric acid formed in the anode chamber, said chlorine and sulphuric acid being permitted to act upon the metal contents of the ore to form chlorides and sulphates which are dissolved in the solution, separating the barren solids from the resultant pregnant solution and mixing the caustic soda solution from the cathode chamber with the filtrate to precipitate certain of the metals.

4. The process of extracting the metals silver, zinc, lead, copper from their ores which consists in crushing the ore and mixing it with a solution of sodium chloride and sodium sulphate, subjecting the mixture to electrolytic action in the anode chamber of a cell in which the anode and cathode chambers are separated, whereby the caustic soda formed in the cathode chamber is kept separate from the chlorine and sulphuric acid formed in the anode chamber, said chlorine and sulphuric acid being permitted to act upon the metal contents of the ore to form chlorides and sulphates which are dissolved in the solution, separating the barren solids from the resultant pregnant solution, mixing the caustic soda from the cathode chamber with the pregnant solution to precipitate certain of the metals in the form of hydroxides, and subsequently treating the solution to recover any silver, gold, zinc, lead, copper therefrom.

5. The process of extracting the metals gold, silver, zinc, copper and lead from their ores which consists in crushing the ore and mixing it with a solution of sodium chloride and sodium sulphate, subjecting the mixture to electrolytic action in the anode chamber of a cell in which the anode and cathode chambers are separated, whereby the caustic soda formed in the cathode chamber is kept separate from the chlorine and sulphuric acid formed in the anode chamber, said chlorine and sulphuric acid being permitted to act upon the metal contents of the ore to form chlorides and sulphates which are dissolved in the solution, separating the barren solids from the resultant pregnant solution, mixing the caustic soda from the cathode chamber with the pregnant solution to precipitate certain of the metals in the form of hydroxides, separating the hydroxides from the solution, and subsequently treating the solution with a metallic dust to precipitate any silver, gold, zinc, lead, copper therefrom.

6. The process of extracting silver from its ore, which consists in crushing the ore and mixing it with a solution of sodium chloride and sodium sulphate, subjecting the mixture to electrolytic action and permitting the chlorine and sulphuric acid formed thereby to attack the metal contents of the ore and form chlorides and sulphates which are dissolved in the solution, subsequently treating the solution to precipitate most of the metals in said ore except silver, and then treating the solution with a metallic dust to precipitate the silver.

7. The process of extracting metals from their ores, which consists in crushing the ore and mixing it with a sodium chloride solution to form a pulp, subjecting the said pulp to electrolytic action whereby chemically active agents are set free and re-act upon the metal content of the ore to combine therewith and form soluble compounds, separating the barren solids from the resulting pregnant solution, and subsequently treating the pregnant solution to recover the metals therein.

8. The process of extracting metals from their ores, which consists in crushing the ore and mixing it with a sodium chloride and sodium sulphate solution to form a pulp, subjecting the pulp to electrolytic action in the anode chamber of a cell in which the anode and cathode chambers are separated, whereby chemically active agents are set free in the anode chamber and re-act upon the metal content of the ore to combine therewith and form soluble compounds, separating the barren solids from the resultant pregnant solution of the anode chamber, mixing the solution from the cathode chamber with the said pregnant solution to precipitate certain of the metals, and subsequently treating the solution to recover other metals therefrom.

9. A process of extracting metals from their ores in which the crushed ore is introduced directly into the electrolyte of a battery and subjected to electrolytic action whereby chemically active agents are set free and re-act upon the metal content of the ore.

10. A process of extracting metals from their ores in which the crushed ore is introduced directly into the electrolyte solution of the cathode chamber of a battery in which the anode and cathode chambers are separated by a diaphragm.

11. The process of extracting the metals gold, silver, zinc, lead, copper, from their ores which consists in crushing the ore and mixing it with a sodium chloride solution and subjecting the mixture to an electrolytic action whereby chemically active agents are set free and re-act upon the metal content of the ore, the salt solution containing an excess of salt over and above the portion thereof which will be decomposed by the electrolytic action.

12. The process of extracting the metals gold, silver, zinc, lead, copper from their ores, which consists in crushing the ore and mixing it with a sodium chloride and sodium sulphate solution to form a pulp, subjecting the said pulp to electrolytic action whereby chemically active agents are set free and re-act upon the metal content of the ore to combine therewith and form soluble compounds, constantly agitating the pulp during the electrolytic action, separating the barren solids from the resultant pregnant solution, and subsequently freeing the pregnant solution to recover the metals therefrom.

In testimony whereof, I have signed my name to this specification in the presence of two subscribing witnesses.

JOHN ALLINGHAM.

Witnesses:
W. J. OLIVE,
Z. R. CROZIER.